United States Patent
Maeda (10) Patent No.: US 10,640,142 B2
(45) Date of Patent: May 5, 2020

(54) MULTILAYERED SLIDING MEMBER AND RACK-AND-PINION TYPE STEERING APPARATUS FOR AUTOMOBILE USING THE SAME

(71) Applicant: OILES CORPORATION, Tokyo (JP)

(72) Inventor: Takuya Maeda, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 47 days.

(21) Appl. No.: 15/566,863

(22) PCT Filed: Mar. 30, 2016

(86) PCT No.: PCT/JP2016/001856
§ 371 (c)(1),
(2) Date: Oct. 16, 2017

(87) PCT Pub. No.: WO2016/170742
PCT Pub. Date: Oct. 27, 2016

(65) Prior Publication Data
US 2018/0118251 A1 May 3, 2018

(30) Foreign Application Priority Data
Apr. 24, 2015 (JP) .................. 2015-089884

(51) Int. Cl.
*B62D 3/12* (2006.01)
*F16H 19/04* (2006.01)
(Continued)

(52) U.S. Cl.
CPC .................. *B62D 3/12* (2013.01); *B32B 5/16* (2013.01); *B32B 7/04* (2013.01); *B32B 15/08* (2013.01);
(Continued)

(58) Field of Classification Search
CPC .......... B62D 3/12; F16C 33/12; F16C 33/125; F16C 33/203; F16C 33/206; F16C 33/208; F16H 19/04; F16H 57/041
See application file for complete search history.

(56) References Cited

U.S. PATENT DOCUMENTS 6,548,188 B1 4/2003 Yanase et al.
8,076,007 B2 * 12/2011 Yanase .................... C08L 27/18
428/550
(Continued)

FOREIGN PATENT DOCUMENTS

CN 1312330 A 9/2001
CN 102131688 A 7/2011
(Continued)

OTHER PUBLICATIONS

International Search Report for PCT/JP2016/001856, dated Jun. 28, 2016, 4 pages.
(Continued)

*Primary Examiner* — Faye M Fleming
(74) *Attorney, Agent, or Firm* — Nixon & Vanderhye P.C.

(57) ABSTRACT

A rack-and-pinion type steering apparatus 1 comprises a gear case 3 made of aluminum or an aluminum alloy and having a hollow portion 2; a steering shaft 6 rotatably supported by the gear case 3 through rolling bearings 4 and 5; a pinion 7 which is provided integrally on a shaft end portion of the steering shaft 6 and is rotatably supported in the hollow portion 2 by the gear case 3 through the steering shaft 6; a rack bar 9 on which rack teeth 8 meshing with the pinion 7 are formed; a rack guide 10 which is disposed in the hollow portion 2 of the gear case 3 and supports the rack bar 9 slidably; and a spring 11 constituted by a coil spring for pressing the rack guide 10 toward the rack bar 9.

4 Claims, 2 Drawing Sheets (51) Int. Cl.
   *F16H 57/04*    (2010.01)
   *F16C 33/12*    (2006.01)
   *F16C 33/20*    (2006.01)
   *B32B 5/16*     (2006.01)
   *B32B 7/04*     (2019.01)
   *B32B 27/20*    (2006.01)
   *B32B 15/16*    (2006.01)
   *B32B 15/08*    (2006.01)
   *C10M 169/04*   (2006.01)
   *B32B 27/34*    (2006.01)
   *B32B 27/22*    (2006.01)
   *B32B 15/18*    (2006.01)
   *B32B 27/30*    (2006.01)
   *F16H 55/28*    (2006.01)
   *C08K 3/32*     (2006.01)
   *C08L 27/18*    (2006.01)
   *C08L 101/00*   (2006.01)

(52) U.S. Cl.
   CPC .............. *B32B 15/16* (2013.01); *B32B 15/18* (2013.01); *B32B 27/20* (2013.01); *B32B 27/22* (2013.01); *B32B 27/306* (2013.01); *B32B 27/34* (2013.01); *C10M 169/044* (2013.01); *F16C 33/12* (2013.01); *F16C 33/125* (2013.01); *F16C 33/203* (2013.01); *F16C 33/206* (2013.01); *F16C 33/208* (2013.01); *F16H 19/04* (2013.01); *F16H 57/041* (2013.01); *B32B 2250/24* (2013.01); *B32B 2255/04* (2013.01); *B32B 2255/26* (2013.01); *B32B 2262/02* (2013.01); *B32B 2262/0261* (2013.01); *B32B 2262/0269* (2013.01); *B32B 2262/0276* (2013.01); *B32B 2262/0292* (2013.01); *B32B 2262/10* (2013.01); *B32B 2262/101* (2013.01); *B32B 2262/105* (2013.01); *B32B 2262/106* (2013.01); *B32B 2264/105* (2013.01); *B32B 2307/306* (2013.01); *B32B 2307/554* (2013.01); *B32B 2307/7242* (2013.01); *B32B 2307/7265* (2013.01); *B32B 2307/732* (2013.01); *B32B 2439/60* (2013.01); *B32B 2439/70* (2013.01); *B32B 2439/80* (2013.01); *B32B 2597/00* (2013.01); *B32B 2605/08* (2013.01); *C08K 3/32* (2013.01); *C08K 2003/321* (2013.01); *C08L 27/18* (2013.01); *C08L 101/00* (2013.01); *C10M 2201/062* (2013.01); *C10M 2201/085* (2013.01); *C10M 2201/102* (2013.01); *C10M 2209/101* (2013.01); *C10M 2209/102* (2013.01); *C10M 2213/0623* (2013.01); *C10M 2217/044* (2013.01); *C10N 2210/02* (2013.01); *C10N 2210/03* (2013.01); *C10N 2230/06* (2013.01); *C10N 2250/14* (2013.01); *F16H 55/283* (2013.01)

(56) References Cited

U.S. PATENT DOCUMENTS 8,420,580 B2 * 4/2013 Iwata .................. C10M 169/04
                                                    508/106
2011/0148064 A1   6/2011 Yanase et al.

FOREIGN PATENT DOCUMENTS

| JP | 39-16950 | 8/1964 |
| JP | 61-52322 | 11/1986 |
| JP | 1-27495 | 8/1989 |
| JP | 8-41484 | 2/1996 |
| JP | 2013-036618 | 2/2013 |
| JP | 2014-134290 | 7/2014 |
| JP | 2014-142070 | 8/2014 |
| JP | 2014142070 A * | 8/2014 |
| WO | WO 2010/023911 | 3/2010 |

OTHER PUBLICATIONS

Decision of Refusal dated Jul. 9, 2019 in Japanese Application No. 2015-089884, with English translation, 6 pages.

Second Office Action dated Aug. 1, 2019 in Chinese Application No. 201680023516.5, with English translation, 13 pages.

* cited by examiner

MULTILAYERED SLIDING MEMBER AND RACK-AND-PINION TYPE STEERING APPARATUS FOR AUTOMOBILE USING THE SAME

This application is the U.S. national phase of International Application No. PCT/JP2016/001856 filed 30 Mar. 2016, which designated the U.S. and claims priority to JP Patent Application No. 2015-089884 filed 24 Apr. 2015, the entire contents of each of which are hereby incorporated by reference.

TECHNICAL FIELD

The present invention relates to a multilayered sliding member excelling in friction and wear characteristics and a rack-and-pinion type steering apparatus for an automobile using the same.

BACKGROUND ART

A multilayered sliding member (refer to Patent Documents 1 to 3), which is comprised of a backing plate formed of a steel plate, a porous metal sintered layer formed on one surface of the backing plate, and a coating layer filled in the pores of, and coated on the surface of, the porous metal sintered layer, is widely used as a supporting means for smoothly and slidably supporting a rotating shaft or a reciprocating body in various machine equipment in the form of a so-called wrapped bush, which is formed by being wound into a cylindrical form with the coating layer placed on the inner side or in the form of a sliding plate, or as a rack guide (refer to Patent Document 4) for smoothly and slidably supporting a rack bar in a rack-and-pinion type steering apparatus for an automobile.

A polytetrafluoroethylene resin (hereafter abbreviated as PTFE) which has chemical resistance and heat resistance is used extensively for the coating layer of such a multilayered sliding member. However, since the coating layer consisting singly of the PTFE is inferior in wear resistance and load bearing capability, various additives are added to the coating layer depending on the use and application of the multilayered sliding member, so as to compensate for the drawbacks of the PTFE itself.

PRIOR ART DOCUMENTS

Patent Documents

Patent document 1: JP-B-1964-16950
Patent document 2: JP-A-1996-41484
Patent document 3: JP-B-1986-52322
Patent document 4: JP-UM-B-1989-27495

SUMMARY OF THE INVENTION

Problems to be Solved by the Invention

In multilayered sliding members which are used in various applications, since lead or a lead oxide as an additive described in Patent Document 1 is an environmental load substance, the situation is such that it is inevitable to disuse the lead or lead oxide from the standpoint of such as environmental contamination and pollution. A phosphate or a barium sulfate, a magnesium silicate or mica, and lead, tin, a lead-tin alloy, or a mixture thereof which are used as additives described in Patent Document 2, and a tetrafluoroethylene-perfluoroalkylvinylether copolymer resin as an additive described in Patent Document 3, are difficult to apply to a rack guide in the rack-and-pinion type steering apparatus for an automobile in the light of load bearing capability and wear resistance.

The present invention has been devised in view of the above-described aspects, and its object is to provide a multilayered sliding member excelling in load bearing capability and wear resistance, as well as a rack-and-pinion type steering apparatus for an automobile using the same.

Means for Solving the Problems

A multilayered sliding member in accordance with the present invention comprises: a backing plate; a porous metal sintered layer formed on one surface of the backing plate; and a coating layer filling pores of, and coating a surface of, the porous metal sintered layer, the coating layer including a PTFE and 10 to 40% by mass of a metal metaphosphate.

As the PTFE constituting a principal component in the coating layer of the multilayered sliding member in accordance with the present invention, a PTFE of a molding powder used mainly for molding or of a fine powder is suitably used. As preferred examples of the PTFE for use as the molding powder, it is possible to cite "Teflon (registered trademark) 7-J (tradename)," "Teflon (registered trademark) 70-J (tradename)," or the like manufactured by Du Pont-Mitsui Fluorochemicals Co., Ltd., "POLYFLON (registered trademark) M-12 (tradename)" or the like manufactured by Daikin Industries, Ltd., and "Fluon (registered trademark) G163 (tradename)," "Fluon (registered trademark) G190 (tradename)," or the like manufactured by Asahi Glass Co., Ltd. Meanwhile, as preferred examples of the PTFE for use as the fine powder, it is possible to cite "Teflon (registered trademark) 6CJ (tradename)" or the like manufactured by Du Pont-Mitsui Fluorochemicals Co., Ltd., "POLYFLON (registered trademark) F201 (tradename)" or the like manufactured by Daikin Industries, Ltd., and "Fluon (registered trademark) CD097E (tradename)" or the like manufactured by Asahi Glass Co., Ltd.

The compounding amount of the PTFE for forming the coating layer is preferably not less than 50% by mass, more preferably 50 to 75% by mass.

The metal metaphosphate as an additive for the PTFE, which is the principal component for forming the coating layer, is not a substance which in itself exhibits lubricity as in solid lubricant of graphite and molybdenum disulfide and the like, but by being compounded into the coating layer in addition to the PTFE constituting the principal component, the metal metaphosphate overcomes the drawbacks of being inferior in wear resistance and load bearing capability in the singular use of the PTFE, and exhibits an effect of promoting the film formability of a lubricating film of the PTFE on the surface (sliding surface) of a mating member in sliding with the mating member, thereby improving initial conformability and improving wear resistance and load bearing capability.

In the present invention, the metal metaphosphate preferably includes at least one of aluminum metaphosphate $[Al(PO_3)_3]$, calcium metaphosphate $[Ca(PO_3)_2]$, lithium metaphosphate $[LiPO_3]$, and magnesium metaphosphate $[Mg(PO_3)_2]$. The amount of the metal metaphosphate compounded into the coating layer is 10 to 40% by mass, preferably 20 to 40% by mass, and more preferably 20 to 30% by mass. If the amount of the metal metaphosphate compounded into the coating layer is less than 10% by mass, it is difficult to obtain the above-described effect, whereas if the compounding amount exceeds 40% by mass, the amount of the lubricating film of the PTFE formed on the surface of the mating member becomes excessively large, hence lowering the wear resistance to the contrary.

In the present invention, for the purpose of further improving low frictional property and wear resistance, the coating layer may further contain 3 to 20% by mass of a heat resistant resin as other additive. Such a heat resistant resin may include at least one of a polyimide resin, a polyamide-imide resin, an aromatic polyamide resin, an aromatic polyester resin, and a polyether ether ketone resin (PEEK).

The polyimide resin may be either a thermosetting polyimide resin or a thermoplastic polyimide resin; however, from the viewpoint of obtaining an excellent sliding member, it is preferable to adopt a thermosetting polyimide resin which is cured after forming a three-dimensional network structure due to condensation reaction or addition reaction. As preferred examples of the thermosetting polyimide resin, it is possible to cite "Bismaleimide (tradename)" manufactured by Ciba-Geigy AG, "UIP-R,-S (tradenames)" manufactured by Ube Industries, Ltd., "P84 (tradename)" manufactured by Lenzing AG, and the like. In addition, as a preferred example of the thermoplastic polyimide resin, it is possible to cite AURUM (tradename) manufactured by Mitsui Chemicals, Inc.

As a preferred example of the polyamide-imide resin, it is possible to cite "Torlon (tradename)" manufactured by Solvay Advanced Polymers L.L.C.

As preferred examples of the aromatic polyamide resin, it is possible to cite a meta-type polymetaphenylene isophthalamide resin, a para-type polyparaphenylene terephthalamide resin, a copolyparaphenylene 3,4'-oxydiphenylene terephthalamide resin. As preferred examples of the meta-type polymetaphenylene isophthalamide resin, it is possible to cite "Conex (tradename)" manufactured by Teijin Limited and "Nomex (tradename)" manufactured by DuPont. As preferred examples of the para-type polyparaphenylene terephthalamide resin, it is possible to cite "Kevlar (tradename)" manufactured by DuPont and "Twaron (tradename)" manufactured by Teijin Twaron B. V. As a preferred example of the copolyparaphenylene 3,4'-oxydiphenylene terephthalamide resin, it is possible to cite "Technora (tradename)" manufactured by Teijin Limited. These aromatic polyamide resins are used in the form of powder.

As the aromatic polyester resin, a homopolymer of p-hydroxybenzoic acid and a copolymer of p-hydroxybenzoic acid, aromatic dicarboxylic acid, and aromatic diol can be used which are oxybenzoyl polyesters having a recurring unit represented by Chemical Formula 1, and, in particular, a homopolymer of p-hydroxybenzoic acid is suitably used. Crystal structures of these resins are sheet-like crystal structures and excel in self-lubricity. As a preferred example of the aromatic polyester resin, "Sumika Super E101S (tradename)" manufactured by Sumitomo Chemical Co., Ltd. can be cited. This aromatic polyester resin is used in the form of powder.

[Chemical formula 1]

As preferred examples of the polyether ether ketone resin (PEEK), it is possible to cite such as "PEEK-150PF, 450PF" manufactured by Victrex PLC.

The heat resistant resin which includes at least one of a polyimide resin, a polyamide-imide resin, an aromatic polyamide resin, an aromatic polyester resin, and a polyether ether ketone resin exhibits the effect of improving the low friction property and wear resistance of the coating layer. The amount of the heat resistant resin compounded is preferably 3 to 20% by mass, more preferably 5 to 15% by mass. If the compounding amount is less than 3% by mass, an effect is not shown in the improvement of wear resistance, whereas if the compounding amount exceeds 20% by mass, not only is the formability of the coating layer adversely affected, but there is a possibility of causing a decline in the strength of the coating layer. The average particle size of the powder used in these heat resistant resins is 3 to 100 μm, preferably 5 to 50 μm. If the average particle size is in excess of 100 μm or is less than 3 μm, the load sharing capacity is insufficient, and there is a possibility that sufficient load bearing capability, wear resistance, and low friction property cannot be obtained.

A rack-and-pinion type steering apparatus in accordance with the present invention comprises: a gear case; a pinion supported rotatably by the gear case; a rack bar on which rack teeth meshing with the pinion are formed; a rack guide for slidably supporting the rack bar; and a spring for pressing the rack guide toward the rack bar, wherein the rack guide includes a rack guide base body having a cylindrical outer peripheral surface which is slidably brought into contact with a cylindrical inner peripheral surface of the gear case, and the multilayered sliding member which is secured at the backing plate thereof to the rack guide base body, the coating layer of the multilayered sliding member having a recessed surface which is slidably brought into sliding contact with an outer peripheral surface of the rack bar.

In the rack-and-pinion type steering apparatus in accordance with the present invention, the rack guide base body may have a circular arc-shaped recessed surface on which the backing plate of the multilayered sliding member is seated and a circular hole formed in a center of a bottom portion of the circular arc-shaped recessed surface, in which case the multilayered sliding member may include a main body having the recessed surface and a projecting surface of a shape complementary to the circular arc-shaped recessed surface of the rack guide base body and a hollow cylindrical projecting portion which is integrally formed to the main body in a center of a bottom portion of the projecting surface and is fitted in the hole of the rack guide base body.

Advantages of the Invention

According to the present invention, it is possible to provide a multilayered sliding member excelling in load bearing capability and wear resistance, as well as a rack-and-pinion type steering apparatus for an automobile using the same.

MODE FOR CARRYING OUT THE INVENTION

Next, a more detailed description will be given of the present invention and a mode for carrying it out on the basis of the preferred embodiment shown in the drawings and examples. It should be noted that the present invention is not limited to the embodiment and the examples.

In FIGS. 1 to 4, a rack-and-pinion type steering apparatus 1 is comprised of a gear case 3 made of aluminum or an aluminum alloy and having a hollow portion 2; a steering shaft 6 rotatably supported by the gear case 3 through rolling bearings 4 and 5; a pinion 7 which is provided integrally on a shaft end portion (pinion shaft) of the steering shaft 6 and is rotatably supported in the hollow portion 2 by the gear case 3 through the steering shaft 6; a rack bar 9 on which rack teeth 8 meshing with the pinion 7 are formed; a rack guide 10 which is disposed in the hollow portion 2 of the gear case 3 and supports the rack bar 9 slidably; and a spring 11 constituted by a coil spring for pressing the rack guide 10 toward the rack bar 9.

Figure 2:
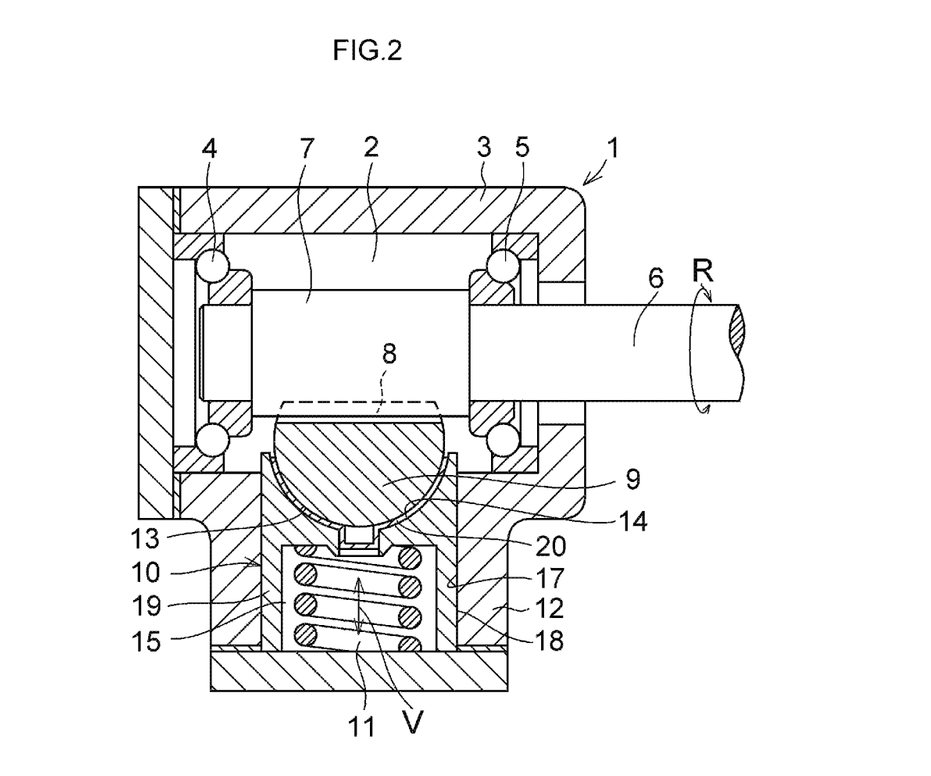
FIG. 2 is an explanatory cross-sectional view of a rack-and-pinion type steering apparatus in accordance with a preferred embodiment of the present invention.
Figure 3:
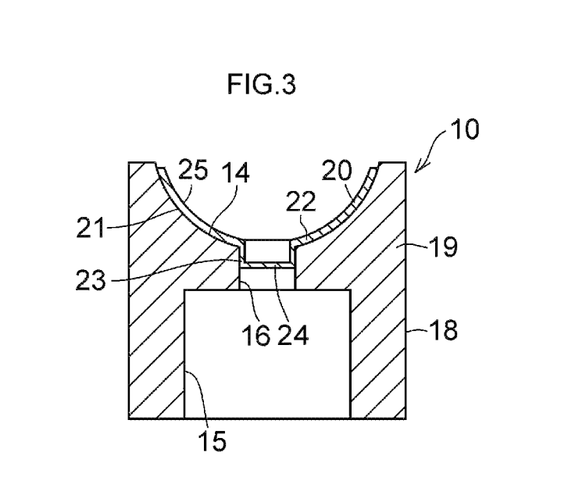
FIG. 3 is an explanatory cross-sectional view, taken along line III-III shown in FIG. 4, of a rack guide of the embodiment shown in FIG. 2.
Figure 4:
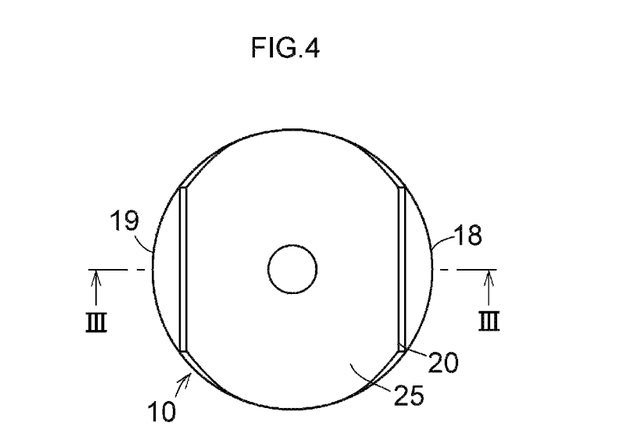
FIG. 4 is an explanatory plan view of the rack guide shown in FIG. 3.

The gear case 3 has a cylindrical portion 12, and the rack bar 9, which is passed through the gear case 3 in an orthogonal direction to the axis of the steering shaft 6 and is disposed movably in that orthogonal direction, has a circular arc-shaped outer peripheral surface 13 on a rear surface side thereof opposing a surface thereof where the rack teeth 8 are formed.

Figure 1:
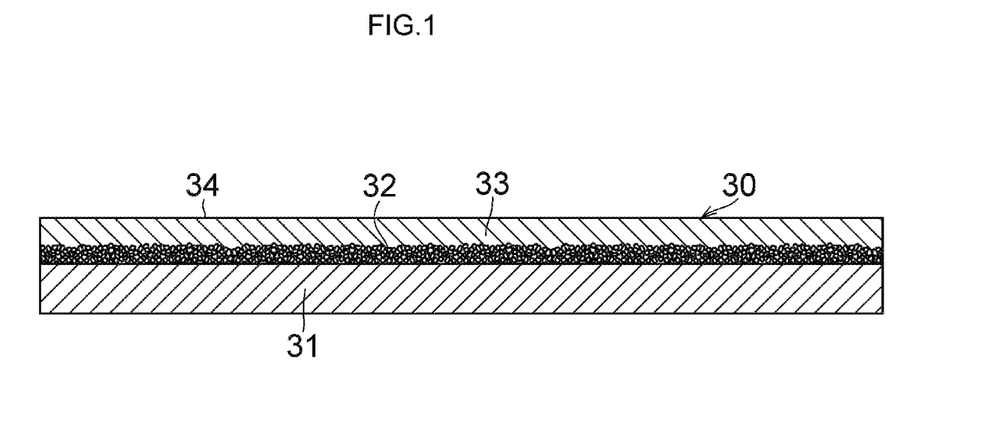
FIG. 1 is an explanatory cross-sectional view of a multilayered sliding member in accordance with a preferred embodiment of the present invention.

The rack guide 10 includes a rack guide base body 19 which has a circular arc-shaped recessed surface 14, a recess 15, a circular hole 16 constituted by a through hole communicating with the recess 15 and formed in the center of a bottom portion of the circular arc-shaped recessed surface 14, and a cylindrical outer peripheral surface 18 slidably contacting a cylindrical inner peripheral surface 17 of the cylindrical portion 12 with a sliding clearance therebetween, and which is formed of aluminum or an aluminum alloy, zinc or a zinc alloy, or an iron-based sintered metal; and a sliding plate piece 20 secured to the rack guide base body 19. The sliding plate piece 20 includes a circular arc-shaped main body 22 having a circular arc-shaped projecting surface 21 of a shape complementary to that of the circular arc-shaped recessed surface 14 and a recessed surface 25 of a shape complementary to that of the projecting surface 21; a cylindrical hollow projecting portion 23 formed integrally with the main body 22 and extending from the center of the bottom portion of the projecting surface 21 toward the hole 16; and a distal end closure portion 24 serving as a reinforcing portion formed integrally at a distal end of the hollow projecting portion 23. The sliding plate piece 20 is fixed to the rack guide base body 19 as the hollow projecting portion 23 is fittingly secured in the hole 16 so as to be tightly seated on the circular arc-shaped recessed surface 14 at the projecting surface 21. As shown in FIG. 1, as the sliding plate piece 20, a multilayered sliding member 30 is used which has a backing plate 31 formed of a steel plate; a porous metal sintered layer 32 formed integrally on the surface of the backing plate 31; and a coating layer (sliding layer) 33 constituted of a synthetic resin composition filling the pores of, and coating the surface of, the porous metal sintered layer 32, the coating layer 33 being constituted of the synthetic resin composition composed of a polytetrafluoroethylene resin and 10 to 40% by mass of a metal metaphosphate or 10 to 40% by mass of a metal metaphosphate and 3 to 20% by mass of a heat resistant resin. In the sliding plate piece 20 constituted by the multilayered sliding member 30, the recessed surface 25 which slidably supports the rack bar 9 by slidably coming into contact with the outer peripheral surface 13 is constituted by a surface 34 of the coating layer 33.

In the rack-and-pinion type steering apparatus 1, the rack guide 10, which is movable in a V direction, i.e., a direction orthogonal to the axis of the steering shaft 6, and presses at its recessed surface 25 the circular arc-shaped outer peripheral surface 13 by the spring 11, ensures the meshing of the rack teeth 8 with the pinion 7 in the rotation in an R direction of the steering shaft 6 and guides the movement of the rack bar 9 in the direction (in a direction perpendicular to the plane of the drawing of FIG. 2) orthogonal to the axis of the steering shaft 6 on the basis of the meshing.

Next, a description will be given of a method of manufacturing the multilayered sliding member 30 shown in FIG. 1 and including the backing plate 31 formed of a steel plate, the porous metal sintered layer 32 formed by being coated on one surface of the backing plate 31, and the coating layer 33 constituted of a synthetic resin composition filled in the pores of, and coated on the surface of, the porous metal sintered layer 32.

As the backing plate 31, a rolled steel plate for general structure is suitably used. As for the steel plate, it is preferable to use a continuous strip which is provided as a hoop wound in coil form. However, the steel plate is not necessarily limited to the continuous strip, and a strip which is cut to an appropriate length may also be used. These strips may be provided with such as copper plating or tin plating, as required, so as to improve corrosion resistance. The thickness of the steel plate as the backing plate should preferably be 0.5 to 1.5 mm, in general.

As the porous metal sintered layer 32, a metal powder constituted of a copper alloy or the like is generally used which passes a 100-mesh sieve, such as bronze, lead bronze, or phosphor bronze which excels in friction and wear characteristics. Depending on usage, however, it is also possible to use a metal powder of such as an aluminum alloy or iron other than the copper alloy powder. In terms of the particulate form of this metal powder, it is possible to use a metal powder having massive shape, spherical shape, or other irregular shapes. The porous metal sintered layer 32 should be such that particles of the metal powder are firmly sintered to each other and to the strip of the steel plate or the like, respectively, and should have a fixed thickness and the porosity of a required value. The thickness of the porous metal sintered layer 32 is preferably 0.15 to 0.40, particularly 0.2 to 0.3 mm. The porosity is recommended to be generally not less than 10% by volume, particularly 15 to 40% by volume.

In forming the coating layer 33, a petroleum-based solvent is added to a mixture obtained by mixing a PTFE powder and an additive powder, and stirring and mixing are carried out, to thereby obtain a synthetic resin composition with wettability imparted thereto. The mixing of the PTFE and additive powders and the stirring and mixing of this mixture and the petroleum-based solvent are effected at a temperature not more than the room-temperature transition point (19° C.) of the PTFE, preferably from 10 to 18° C. By the adoption of such a temperature condition, it is possible to obtain a synthetic resin composition in which fibrillation of the PTFE is inhibited, wettability is imparted thereto, and the PTFE powder, the additive powder, and the petroleum-based solvent are uniformly mixed.

As the petroleum-based solvent, naphtha, toluene, xylene, or a mixed solvent of such a solvent and an aliphatic solvent or a naphthenic solvent is used. The ratio of the petroleum-based solvent used is preferably from 15 to 30 parts by mass based on 100 parts by mass of the mixture of the PTFE powder and the additive powder. If the ratio of the petroleum-based solvent used is less than 15 parts by mass, the ductility of the synthetic resin composition with the wettability imparted thereto is poor in the below-described step of filling and coating the synthetic resin composition including the PTFE powder and the additive powder onto the porous metal sintered layer 32, with the result that uneven filling and coating of the synthetic resin composition onto the porous metal sintered layer 32 is likely to occur. On the other hand, if the ratio of the petroleum-based solvent used exceeds 30 parts by mass, not only does such filling and coating operation become difficult due to a decline in the viscosity of the synthetic resin composition, but the uniformity of the coating thickness of the synthetic resin composition on the porous metal sintered layer 32 can be impaired, and the adhesion strength between the synthetic resin composition and the porous metal sintered layer 32 becomes deteriorated.

The multilayered sliding member 30 in accordance with the present invention can be produced through, for example, the following Steps (a) to (d).

Step (a)

The synthetic resin composition with wettability imparted thereto is supplied to and spread over the surface of the porous metal sintered layer 32 formed on one surface of the backing plate 31 formed of a steel plate, or the like, and is subjected to rolling by a roller, thereby filling the synthetic resin composition into pores of the porous metal sintered layer 32 and forming on the surface of the porous metal sintered layer 32 a layer constituted of the synthetic resin composition having a uniform thickness. In this step, the thickness of the layer constituted of the synthetic resin composition is set to from 2 to 2.2 times the thickness of the coating layer 33 required for the a final product. The filling of the synthetic resin composition into the pores of the porous metal sintered layer 32 substantially proceeds in this step.

Step (b)

The backing plate 31 treated in Step (a) and having the porous metal sintered layer 32 and the layer constituted by the synthetic resin composition is held in a drying furnace heated to a temperature of from 200 to 250° C. for several minutes to remove the petroleum-based solvent. Then, the layer of the dried synthetic resin composition is subjected to pressure roller treatment using a roller under a pressure of 29.4 to 58.8 MPa (300 to 600 kgf/cm$^2$) to obtain a predetermined thickness.

Step (c)

The backing plate 31 treated in Step (b) and having the porous metal sintered layer 32 and the layer of the synthetic resin composition is introduced into a heating furnace, and heated at a temperature of from 360 to 380° C. for a period between several minutes and 10 and several minutes to effect sintering. Then, the backing plate 31 is removed out of the heating furnace and is subjected to roller treatment again to adjust the variation of the size.

Step (d)

The backing plate 31 subjected to size adjustment in Step (c) and having the porous metal sintered layer 32 and the layer of the synthetic resin composition is cooled (air-cooled or naturally cooled), and then subjected to correction roller treatment, as required, so as to correct the waviness or the like of the backing plate 31, thereby obtaining a desired multilayered sliding member 30.

In the multilayered sliding member 30 obtained through Steps (a) to (d), the thickness of the porous metal sintered layer 32 is set to 0.10 to 0.40 mm, and the thickness of the coating layer 33 formed of the synthetic resin composition is set to 0.02 to 0.15 mm. The multilayered sliding member 30 thus obtained is cut into an appropriate size, and is used as a sliding plate in the state of a flat plate, or used as, for example, the sliding plate piece 20 or a cylindrical wrapped bush by being bent round.

Examples 1 to 7

With respect to 100 parts by mass of a mixture obtained by charging into a Henschel mixer a synthetic resin composition, which included one metal metaphosphate among magnesium metaphosphate, aluminum metaphosphate, calcium metaphosphate, and lithium metaphosphate as a metal metaphosphate and a PTFE for fine powder ("POLYFLON (registered trademark) F201 (tradename)" manufactured by Daikin Industries, Ltd.) as a PTFE, at a ratio shown in Table 2 and by mixing and stirring, 20 parts by mass of a mixed solvent ("Exxsol (tradename)" manufactured by Exxon Chemical Company) of an aliphatic solvent and a naphthenic solvent was compounded as a petroleum-based solvent, and was mixed at a temperature (15° C.) lower than the room-temperature transition point of the PTFE, to thereby obtain a wettable synthetic resin composition.

The synthetic resin composition thus obtained was supplied to and spread over the surface of the porous metal (bronze) sintered layer 32 (with a thickness of 0.2 mm) formed by being coated on the surface of a steel plate (with a thickness of 0.7 mm) serving as the backing plate 31, and rolled by a roller such that the thickness of the synthetic resin composition became 0.25 mm, thereby obtaining a multilayered plate in which the synthetic resin composition was filled in the pores of, and coated on the surface of, the porous metal sintered layer 32. The multilayered plate thus obtained was held in a hot-air drying furnace at 200° C. for 5 minutes to remove the solvent. Then, the dried synthetic resin composition was rolled by a roller with a pressurizing force of 39.2 MPa (400 kgf/cm$^2$), such that the thickness of the synthetic resin composition coated on the surface of the porous metal sintered layer 32 was set to 0.10 mm.

The multilayered plate thus pressure-treated was then heated and sintered in a heating furnace at a temperature of 370° C. for 10 minutes, and was subsequently subjected to dimensional adjustment and correction of the waviness and the like, thereby fabricating the multilayered sliding member 30. The multilayered sliding member 30, upon completion of the correction, was cut and subjected to bending, to thereby obtain a semicylindrical multilayered sliding member test piece having a radius of 10.0 mm, a length of 20.0 mm, and a thickness of 1.0 mm.

Examples 8 to 18

With respect to the synthetic resin compositions of Examples 1 to 7 as a heat resistant synthetic resin, a thermosetting polyimide resin ("Bismaleimide (tradename)" manufactured by Ciba-Geigy AG), an aromatic polyamide resin ("Conex (tradename)" manufactured by Teijin Limited), an aromatic polyester resin ("Sumika Super E101S (tradename)" manufactured by Sumitomo Chemical Co., Ltd.), and a polyether ether ketone resin (PEEK) ("PEEK 450PF (tradename)" manufactured by Victrex PLC) were compounded as additional components to fabricate synthetic resin compositions shown in Tables 3 and 4. Semicylindrical multilayered sliding member test pieces each having a radius of 10.0 mm, a length of 20.0 mm, and a thickness of 1.0 mm were obtained by a method similar to that of Examples 1 to 7.

Comparative Example 1

As shown in Table 5, with respect to 100 parts by mass of a mixture obtained by charging into the Henschel mixer 80% by mass of the PTFE identical to that of Examples 1 to 18 and 20% by mass of a lead powder and by mixing and stirring, 20 parts by mass of a petroleum-based solvent identical to that of Examples 1 to 18 was compounded, and was mixed at a temperature (15° C.) lower than the room-temperature transition point of the PTFE, to thereby obtain a synthetic resin composition. Next, a semicylindrical multilayered sliding member test piece having a radius of 10.0 mm, a length of 20.0 mm, and a thickness of 1.0 mm was obtained by a method similar to that of Examples 1 to 18.

Comparative Example 2

As shown in Table 5, with respect to 100 parts by mass of a mixture obtained by charging into the Henschel mixer 70% by mass of the PTFE identical to that of Examples 1 to 18, 10% by mass of calcium hydrogen phosphate as a phosphate, and 20% by mass of a lead powder and by mixing and stirring, 20 parts by mass of a petroleum-based solvent identical to that of Examples 1 to 18 was compounded, and was mixed at a temperature (15° C.) lower than the room-temperature transition point of the PTFE, to thereby obtain a synthetic resin composition. Next, a semicylindrical multilayered sliding member test piece having a radius of 10.0 mm, a length of 20.0 mm, and a thickness of 1.0 mm was obtained by a method similar to that of Examples 1 to 18.

Comparative Example 3

As shown in Table 5, with respect to 100 parts by mass of a mixture obtained by charging into the Henschel mixer 50% by mass of the PTFE identical to that of Examples 1 to 18, 15% by mass of screened barium sulfate as a barium sulfate, 15% by mass of heavy magnesium silicate in which $SiO_2/MgO$ was 2.2 (mass rate) as a magnesium silicate, and 20% by mass of a lead powder and by mixing and stirring, 20 parts by mass of a petroleum-based solvent identical to that of Examples 1 to 18 was compounded, and was mixed at a temperature (15° C.) lower than the room-temperature transition point of the PTFE, to thereby obtain a synthetic resin composition. Next, a semicylindrical multilayered sliding member test piece having a radius of 10.0 mm, a length of 20.0 mm, and a thickness of 1.0 mm was obtained by a method similar to that of Examples 1 to 18.

Sliding characteristics were evaluated by the following test method with respect to the semicylindrical multilayered sliding member test pieces obtained in the above-described Examples 1 to 18 and Comparative Examples 1 to 3.

Reciprocating Sliding Test

The coefficient of friction and the amount of wear were measured under the conditions listed in Table 1, and the test results are shown in Tables 2 to 5. The coefficient of friction shows the value of the coefficient of static friction (upper row) and the value of the coefficient of dynamic friction (lower row) upon completion of the test (after the lapse of 20 hours), while the amount of wear shows the amount of dimensional change of the sliding surface after completion of the test period (20 hours).

TABLE 1

| | |
|---|---|
| Sliding velocity: | 3 m/min |
| Load: | 200 kgf |
| Test period: | 20 hrs. |
| Stroke: | 150 mm |
| Lubrication: | Grease ("MOLYWHITE (tradename)" manufactured by Kyodo Yushi Co., Ltd.) was applied to the sliding surface before the test. |
| Mating member: | High carbon-chromium bearing steel (SUJ2: JIS G 4805) |

TABLE 2

| | | Examples | | | | | |
|---|---|---|---|---|---|---|---|
| | | 1 | 2 | 3 | 4 | 5 | 6 |
| Component Composition | PTFE | 90 | 80 | 70 | 60 | 70 | 70 |
| | <Metal metaphosphate> | | | | | | |
| | Magnesium metaphosphate | 10 | 20 | 30 | 40 | | |
| | Aluminum metaphosphate | | | | | 30 | |
| | Calcium metaphosphate | | | | | | 30 |
| | Lithium metaphosphate | | | | | | |
| | <Heat resistant resin> | | | | | | |
| | Thermosetting polyimide resin | | | | | | |
| | Aromatic polyamide resin | | | | | | |
| | Aromatic polyester resin | | | | | | |
| | PEEK | | | | | | |
| | Barium sulfate (screened) | | | | | | |
| | Calcium hydrogen phosphate | | | | | | |
| | Magnesium silicate | | | | | | |
| | Lead | | | | | | |
| Various Characteristics | Coefficient of friction ($\times 10^{-2}$) | 19.0 | 16.3 | 18.3 | 17.6 | 18.7 | 16.6 |
| | | 11.6 | 6.3 | 6.8 | 6.5 | 7.2 | 6.7 |
| | Amount of wear ($\times 10^{-3}$ mm) | 56 | 51 | 37 | 35 | 46 | 52 |

TABLE 3

| Component Composition | | Examples | | | | | |
|---|---|---|---|---|---|---|---|
| | | 7 | 8 | 9 | 10 | 11 | 12 |
| | PTFE | 70 | 75 | 65 | 80 | 70 | 60 |
| | <Metal metaphosphate> | | | | | | |
| | Magnesium metaphosphate | | 20 | 30 | 10 | 10 | 20 |
| | Aluminum metaphosphate | | | | | | |
| | Calcium metaphosphate | | | | | | |
| | Lithium metaphosphate | 30 | | | | | |
| | <Heat resistant resin> | | | | | | |
| | Thermosetting polyimide resin | | 5 | 5 | 10 | 20 | 20 |
| | Aromatic polyamide resin | | | | | | |
| | Aromatic polyester resin | | | | | | |
| | PEEK | | | | | | |
| | Barium sulfate (screened) | | | | | | |
| | Calcium hydrogen phosphate | | | | | | |
| | Magnesium silicate | | | | | | |
| | Lead | | | | | | |
| Various Characteristics | Coefficient of friction ($\times 10^{-2}$) | 16.5 / 6.6 | 15.2 / 7.6 | 15.3 / 7.1 | 11.5 / 7.4 | 11.2 / 8.3 | 11.6 / 8.7 |
| | Amount of wear ($\times 10^{-3}$ mm) | 54 | 41 | 32 | 46 | 34 | 45 |

TABLE 4

| Component Composition | | Examples | | | | | |
|---|---|---|---|---|---|---|---|
| | | 13 | 14 | 15 | 16 | 17 | 18 |
| | PTFE | 50 | 70 | 70 | 70 | 70 | 70 |
| | <Metal metaphosphate> | | | | | | |
| | Magnesium metaphosphate | 30 | 30 | | | | 20 |
| | Aluminum metaphosphate | | | 20 | | | |
| | Calcium metaphosphate | | | | 20 | | |
| | Lithium metaphosphate | | | | | 20 | |
| | <Heat resistant resin> | | | | | | |
| | Thermosetting polyimide resin | 20 | | 10 | | | |
| | Aromatic polyamide resin | | | | 10 | | |
| | Aromatic polyester resin | | 5 | | | 10 | |
| | PEEK | | | | | | 10 |
| | Barium sulfate (screened) | | | | | | |
| | Calcium hydrogen phosphate | | | | | | |
| | Magnesium silicate | | | | | | |
| | Lead | | | | | | |
| Various Characteristics | Coefficient of friction ($\times 10^{-2}$) | 11.7 / 8.3 | 11.8 / 7.7 | 11.6 / 7.6 | 12.6 / 6.4 | 11.5 / 6.6 | 11.4 / 7.2 |
| | Amount of wear ($\times 10^{-3}$ mm) | 35 | 29 | 42 | 48 | 50 | 48 |

TABLE 5

| Component Composition | | Comparative Examples | | |
|---|---|---|---|---|
| | | 1 | 2 | 3 |
| | PTFE | 80 | 70 | 50 |
| | <Metal metaphosphate> | | | |
| | Magnesium metaphosphate | | | |
| | Aluminum metaphosphate | | | |
| | Calcium metaphosphate | | | |
| | Lithium metaphosphate | | | |
| | <Heat resistant resin> | | | |
| | Thermosetting polyimide resin | | | |
| | Aromatic polyamide resin | | | |
| | Aromatic polyester resin | | | |
| | PEEK | | | |
| | Barium sulfate (screened) | | | 15 |
| | Calcium hydrogen phosphate | | 10 | |
| | Magnesium silicate | | | 15 |
| | Lead | 20 | 20 | 20 |
| Various Characteristics | Coefficient of friction ($\times 10^{-2}$) | 11.7 / 8.3 | 15.0 / 1.0 | 12.0 / 4.6 |
| | Amount of wear ($\times 10^{-3}$ mm) | 90 | 75 | 80 |

From the above-described test results, if comparison is made between the multilayered sliding members of Examples 1 to 18 and the multilayered sliding members of Comparative Examples 1 to 3, with respect to the coefficient of friction, the multilayered sliding members of Examples showed a slightly higher tendency in the coefficient of static friction, but substantially equivalent values were shown in the coefficient of dynamic friction. As for the amount of wear, the multilayered sliding members of Examples exhibited less amounts of wear, and thus it can be understood that the multilayered sliding members of Examples excel in the wear resistance.

DESCRIPTION OF REFERENCE NUMERALS

1: rack-and-pinion type steering apparatus
3: gear case
6: steering shaft
7: pinion
9: rack bar
10: rack guide
11: spring
19: rack guide base body
20: sliding plate piece
30: multilayered sliding member
31: backing plate
32: porous metal sintered layer
33: coating layer

The invention claimed is:

1. A multilayered sliding member comprising: a backing plate; a porous metal sintered layer formed on one surface of said backing plate; and a coating layer filling pores of, and coating a surface of, said porous metal sintered layer, said coating layer including a polytetrafluoroethylene resin and 10 to 40% by mass of a metal metaphosphate,
wherein said coating layer further contains 3 to 20% by mass of a heat resistant resin including at least one of a thermosetting polyimide resin, a polyamide-imide resin, an aromatic polyamide resin, an aromatic polyester resin, and a polyether ether ketone resin.

2. The multilayered sliding member according to claim 1, wherein the metal metaphosphate includes at least one of aluminum metaphosphate, calcium metaphosphate, lithium metaphosphate, and magnesium metaphosphate.

3. A rack-and-pinion type steering apparatus comprising: a gear case; a pinion supported rotatably by said gear case; a rack bar on which rack teeth meshing with said pinion are formed; a rack guide for slidably supporting said rack bar; and a spring for pressing said rack guide toward said rack bar, wherein said rack guide includes a rack guide base body having a cylindrical outer peripheral surface which is slidably brought into contact with a cylindrical inner peripheral surface of said gear case, and the multilayered sliding member according to claim 1 which is secured at said backing plate thereof to said rack guide base body, said coating layer of said multilayered sliding member having a recessed surface which is slidably brought into contact with an outer peripheral surface of said rack bar.

4. The rack-and-pinion type steering apparatus according to claim 3, wherein said rack guide base body has a circular arc-shaped recessed surface on which said backing plate of said multilayered sliding member is seated and a circular hole formed in a center of a bottom portion of the circular arc-shaped recessed surface, and said multilayered sliding member includes a main body having the recessed surface and a projecting surface of a shape complementary to the circular arc-shaped recessed surface of said rack guide base body and a hollow cylindrical projecting portion which is integrally formed to the main body in a center of a bottom portion of the projecting surface and is fitted in the hole of said rack guide base body.

* * * * *